United States Patent

Opsahl et al.

(10) Patent No.: US 12,157,637 B2
(45) Date of Patent: Dec. 3, 2024

(54) GUIDE SYSTEM FOR CONVEYORS

(71) Applicant: Cannon Equipment LLC, Cannon Falls, MN (US)

(72) Inventors: Jeremiah Peder Opsahl, Lakeville, MN (US); Gregory Lawrence Nordling, Big Lake, MN (US)

(73) Assignee: Cannon Equipment LLC, Cannon Falls, MN (US)

( * ) Notice: Subject to any disclaimer, the term of this patent is extended or adjusted under 35 U.S.C. 154(b) by 0 days.

(21) Appl. No.: 18/059,529

(22) Filed: Nov. 29, 2022

(65) Prior Publication Data

US 2023/0166918 A1    Jun. 1, 2023

Related U.S. Application Data

(60) Provisional application No. 63/283,711, filed on Nov. 29, 2021.

(51) Int. Cl.
*B65G 21/20* (2006.01)
*B65G 21/14* (2006.01)
*B65G 41/00* (2006.01)

(52) U.S. Cl.
CPC ......... *B65G 21/2072* (2013.01); *B65G 21/14* (2013.01); *B65G 41/008* (2013.01)

(58) Field of Classification Search
CPC ... B65G 41/008; B65G 21/2072; B65G 21/14
USPC ...................... 198/313, 593, 599, 594, 836.1
See application file for complete search history.

(56) References Cited

U.S. PATENT DOCUMENTS

| | | | |
|---|---|---|---|
| 5,291,988 A | 3/1994 | Leonard | |
| 6,059,096 A | 5/2000 | Gladieux | |
| 6,135,271 A | 10/2000 | Ledingham | |
| 6,378,695 B1 | 4/2002 | Rinne | |
| 6,454,084 B2 | 9/2002 | Csiki et al. | |
| 6,669,009 B2 | 12/2003 | Ledingham et al. | |
| 7,650,729 B2 * | 1/2010 | Whittlesey | B65G 21/06 198/813 |
| 8,776,997 B2 | 7/2014 | Spence | |
| 9,723,746 B2 * | 8/2017 | Chen | A47B 88/43 |
| D814,914 S | 4/2018 | Mason | |
| 10,087,012 B1 * | 10/2018 | Layne | B65G 21/2072 |
| 10,435,246 B2 | 10/2019 | Baek | |
| 10,836,583 B2 | 11/2020 | Ayne et al. | |
| 11,019,926 B2 | 6/2021 | Mattern et al. | |
| 11,097,901 B2 | 8/2021 | Layne et al. | |
| 11,117,750 B2 | 9/2021 | Heuft et al. | |

(Continued)

FOREIGN PATENT DOCUMENTS

JP    2008285295 A  * 11/2008  ............. B65G 21/20

*Primary Examiner* — James R Bidwell
(74) *Attorney, Agent, or Firm* — Andrus Intellectual Property Law, LLP (57) ABSTRACT

A guide system for an extendable conveyor that conveys a product includes a bracket configured to be coupled to the conveyor such that the bracket moves with the conveyor as the conveyor is moved into different positions. A guide member having a leading end that is coupled to the bracket and a trailing end that is configured to be coupled to the conveyor at a position spaced apart from the bracket. The guide member is configured to guide the product along the conveyor, and as the conveyor is moved, the guide member extends or retracts.

11 Claims, 7 Drawing Sheets

(56) References Cited

U.S. PATENT DOCUMENTS

| | | | |
|---|---|---|---|
| 11,639,271 B2 * | 5/2023 | Layne | B65G 21/22 198/836.1 |
| 2005/0011728 A1 | 1/2005 | Ledingham | |
| 2008/0035452 A1 * | 2/2008 | Spencer | B65G 47/71 198/588 |
| 2013/0043110 A1 | 2/2013 | Mason et al. | |
| 2021/0276809 A1 | 9/2021 | Berhnardt | |

* cited by examiner

GUIDE SYSTEM FOR CONVEYORS

CROSS-REFERENCE TO RELATED APPLICATION

The present disclosure is based on and claims priority to U.S. Provisional Patent Application No. 63/283,711 filed Nov. 29, 2021, the disclosure of which is incorporated herein by reference.

FIELD

The present disclosure relates to material handling conveyors, and specifically to guide systems attached to material handling conveyors.

BACKGROUND

Material handling conveyors can be utilized to move objects from one location to another location, and material handling conveyors can be elevated above the ground and/or include one or more components for conveying objects there along such as rollers, drive rollers, and endless belts.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples, a guide system for an extendable conveyor that conveys a product includes a bracket configured to be coupled to the conveyor such that the bracket moves with the conveyor as the conveyor is moved into different positions. A guide member having a leading end that is coupled to the bracket and a trailing end that is configured to be coupled to the conveyor at a position spaced apart from the bracket. The guide member is configured to guide the product along the conveyor, and as the conveyor is moved, the guide member extends or retracts.

In certain examples, a system for conveying a product includes a conveyor configured to convey the product and the conveyor is movable into different positions. A bracket is coupled to the conveyor such that the bracket moves with the conveyor. A guide member has a leading end coupled to the bracket and a trailing end coupled to the conveyor at a position spaced apart from the bracket. The guide member is configured to guide the product along the conveyor, and as the conveyor is moved, the guide member extends or retracts.

In certain examples, a guide system for an extendable conveyor that conveys a product includes a bracket configured to be coupled to the conveyor such that the bracket moves with the conveyor as the conveyor is moved into different positions. A guide assembly has a base configured to be coupled to the conveyor and a guide member configured to guide the product along the conveyor. The guide assembly is spaced apart from the bracket and the guide member has a trailing end and an opposite leading end. The leading end is coupled to the bracket such that a length of the guide member extends between the base and the bracket and along the conveyor, and the leading end is configured to move with the bracket as the conveyor is moved into different positions such that the length of the guide member increases or decreases.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

DETAILED DESCRIPTION

Figure 1:
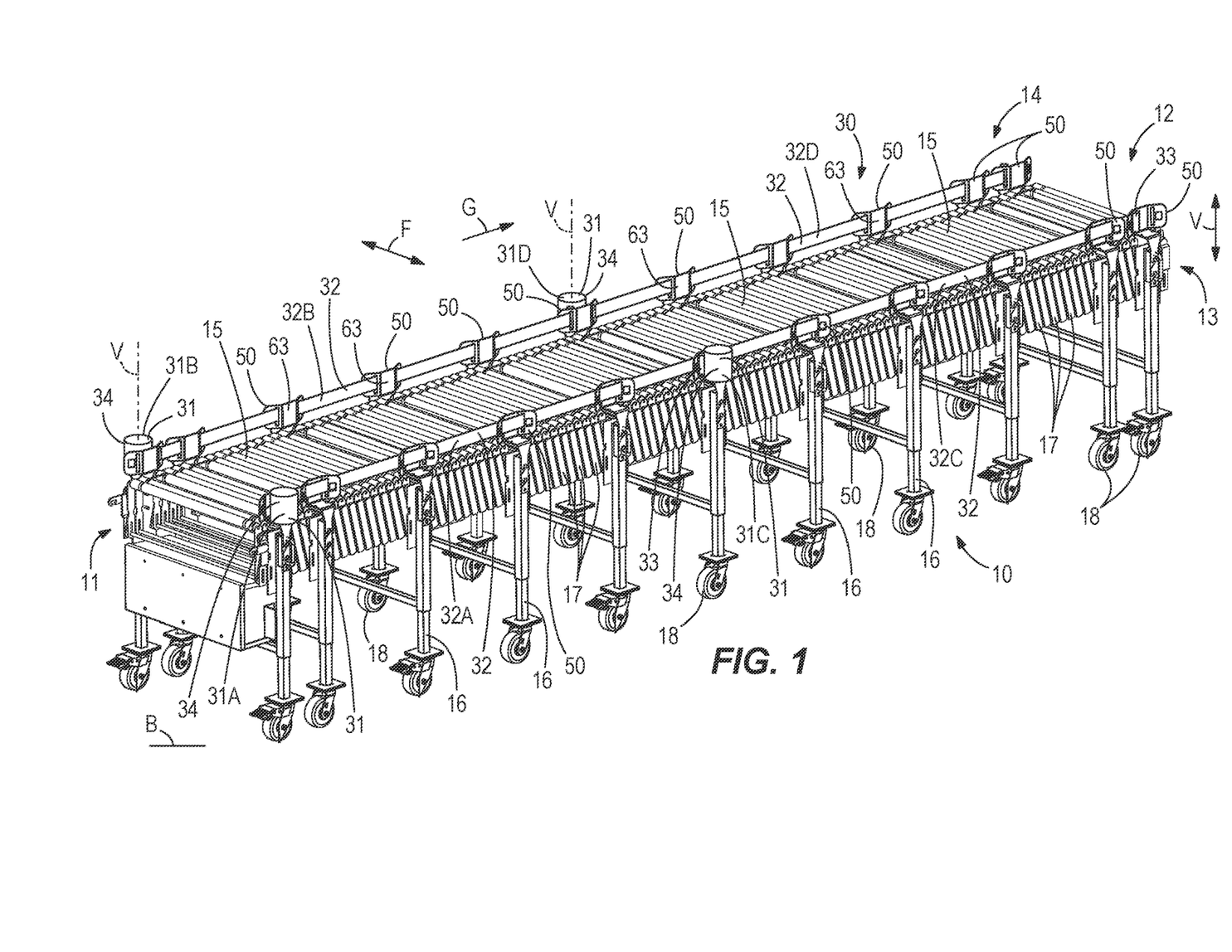
FIG. 1 is a perspective view of an example conveyor with an example guide system of the present disclosure.

FIG. 1 depicts an example material handling conveyor 10 used in industrial or retail settings for conveying objects (e.g., boxed merchandise) between two locations. For example, the conveyor 10 can be an extendable conveyor utilized in a loading dock when unloading objects from a trailer. In this example, a first upstream end 11 of the conveyor 10 is positioned in close proximity to the trailer and an opposite second downstream end 12 is positioned in a different area of the loading dock. Note that in certain examples the objects are manually pushed along the conveyor 10 between the ends 11, 12; however, in other examples, the objects are conveyed by gravity along the conveyor 10 between the ends 11, 12 (e.g., wherein the second end 12 is vertically below the first end 11) or by drive rollers or belts of the conveyor 10.

The conveyor 10 includes opposing lateral sides, namely a first lateral side 13 and a second lateral side 14, and a plurality of rollers 15 extending between the sides 13, 14 in a cross-direction F that is generally transverse to a direction of conveyance G that extends along the conveyor between the ends 11, 12. The rollers 15 define a path P (for clarity the path P is depicted as a simple arrow P on FIGS. 2-4) along which objects are conveyed on the conveyor 10, and the rollers 15 vertically support the objects above the ground B. Links 17 are arranged in an accordion layout to couple the rollers 15 to each other. Vertically extending support posts 16 support the rollers 15 and the links 17 above the ground B. Casters or wheels 18 at the bottom of each support post 16 allow the entire conveyor 10 to be moved and/or sections of the conveyor 10 to be moved relative to each other. Thus, the conveyor 10 can be easily moved into desired configurations or positions and thus into desired shapes to facilitate efficient conveyance of the objects to an unloading location. As such, the shape of the path P corresponds to the shape of the conveyor 10.

As the ends 11, 12 of the conveyor 10 are moved relative to each other, one or more links 17 are moved relative to each other such that the distance between the adjacent rollers 15 and adjacent supports posts 16 change. For instance, as the ends 11, 12 of the conveyor are moved away from each other, the links 17 collectively expand (e.g., in an accordion-type motion) such that the distance between adjacent rollers 15 and support posts 16 increases (compare the conveyor 10 in FIGS. 2-3). Thus, the length of the conveyor 10 in the direction of conveyance G increases. Similarly, as the ends 11, 12 are moved toward each other the links 17 collectively retract (e.g., in an accordion-type motion) such that the distance between adjacent rollers 15 and support post 16 decreases. As such, the length of the conveyor 10 in the direction of conveyance G decreases.

Figure 2:
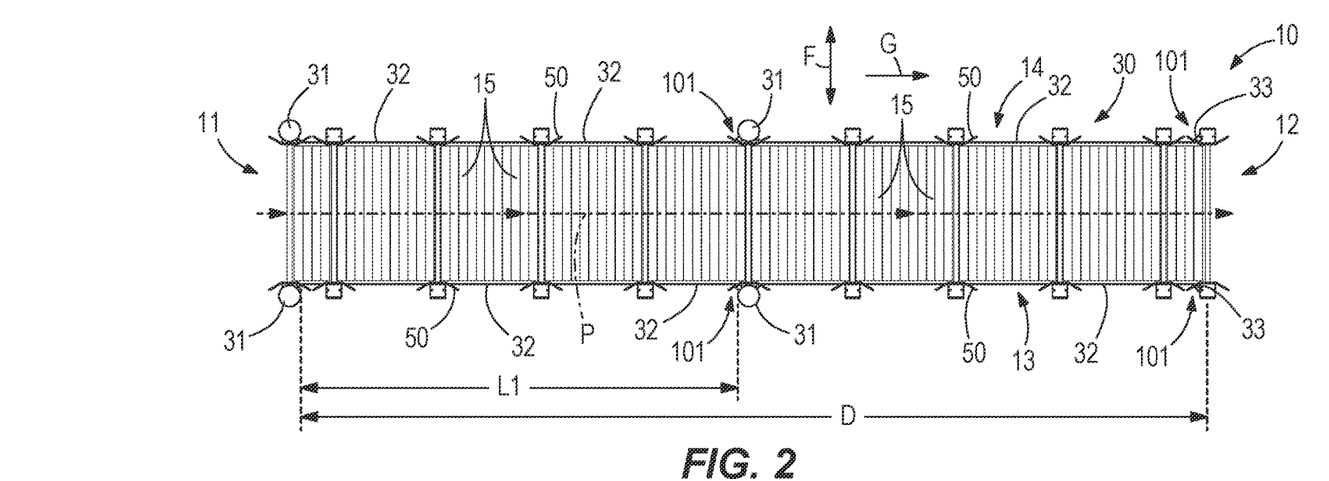
FIG. 2 is a top-down plan view of the conveyor of FIG. 1 in a retracted position.

FIGS. 1-2 depict the conveyor 10 in a retracted position in which the length of the conveyor 10 between the ends 11, 12 is a minimum conveyor length D (FIG. 2). While the conveyor 10 is in the retracted position (see also FIG. 2), the end(s) 11, 12 can be pulled away from each other such that the conveyor 10 is moved into the extended position depicted in FIG. 3. When in the extended position (FIG. 3), the length of the conveyor 10 between the end 11, 12 is at an extended conveyor length E that is greater than the minimum conveyor length D (FIG. 2) and equal to or less than a maximum conveyor length (not depicted). Note that the shape of the conveyor 10 in the extended position (FIG. 3) can remain generally linear relative to the shape of the conveyor 10 in the retracted position (FIG. 1). The ends 11, 12 of the conveyor 10 can also or alternatively be pulled away from each other such that at least a portion of the conveyor 10 has a curved or serpentine shape (see FIG. 4 which depicts the conveyor 10 in a partially curved position). Note that the position of the conveyor can vary from the three example positions noted above.

The present inventors recognized that objects may inadvertently fall off the conveyor 10 as the objects are conveyed along the conveyor 10 thereby causing damage to the objects. In addition, employees may be required to manually lift these objects (which may be heavy) back onto the conveyor 10. The present inventors further recognized that the likelihood that the objects will fall off the conveyor 10 increases when the shape of the conveyor 10 includes one or more turns or curves (see for example the shape of the conveyor 10 depicted in FIG. 4) or the products are not properly placed onto the conveyor 10. Thus, there is a need for systems that prevent objects from inadvertently falling off the conveyor 10. There is also a need for such systems 30 to automatically adjust and/or conform to the shape of the conveyor 10 as the conveyor 10 is moved into different positions (see FIGS. 2-4). Accordingly, through research and experimentation, the present inventors developed the guide systems 30 of the present disclosure which prevent objects from inadvertently falling off the conveyor 10 and automatically adjust and/or conform to the shape of the conveyor 10 as the conveyor 10 is moved into different positions (see e.g., conveyor 10 in positions depicted in FIGS. 2-4).

Returning to FIG. 1, an example guide system 30 for preventing objects from falling off the conveyor 10 is depicted coupled to the conveyor 10. The guide system 30 includes one or more guide assemblies 31A-D coupled the conveyor 10 via a bracket 50 (described further herein), and each guide assembly 31A-D has a retractable guide member 32A-D, such as a flexible ribbon, flexible belt, tension spring, an elastically stretchable rope, or the like. The retractable guide member 32A-D in one example, is contained within a housing 34, and in one specific instance, the retractable guide member 32A-D is coiled or wound about a vertical axis V (FIG. 1) that is defined in the housing 34. Note that in other examples, the guide member 32A-D is mounted on a base 36 (see FIG. 7) which may include any suitable component such as a bottom planar plate and/or vertically extending shaft (not depicted) without a housing 34. In still other examples, the housing 34 is coupled to the base 36 (see FIG. 7). Note that four guide assemblies 31A-D and the related guide members 32A-D are labeled as such in FIG. 1 for clarity. Note that the guide members 32A-D are depicted in the Figures as flexible belts and described hereinbelow as belts, however, as noted above, the guide members 32A-D may be other suitable devices. Note that in certain examples, the guide assembly 31A-D is directly coupled to the conveyor 10, and in still other examples, the guide assembly 31A-D is coupled to the conveyor 10 via a bracket (described herein below).

Figure 3:
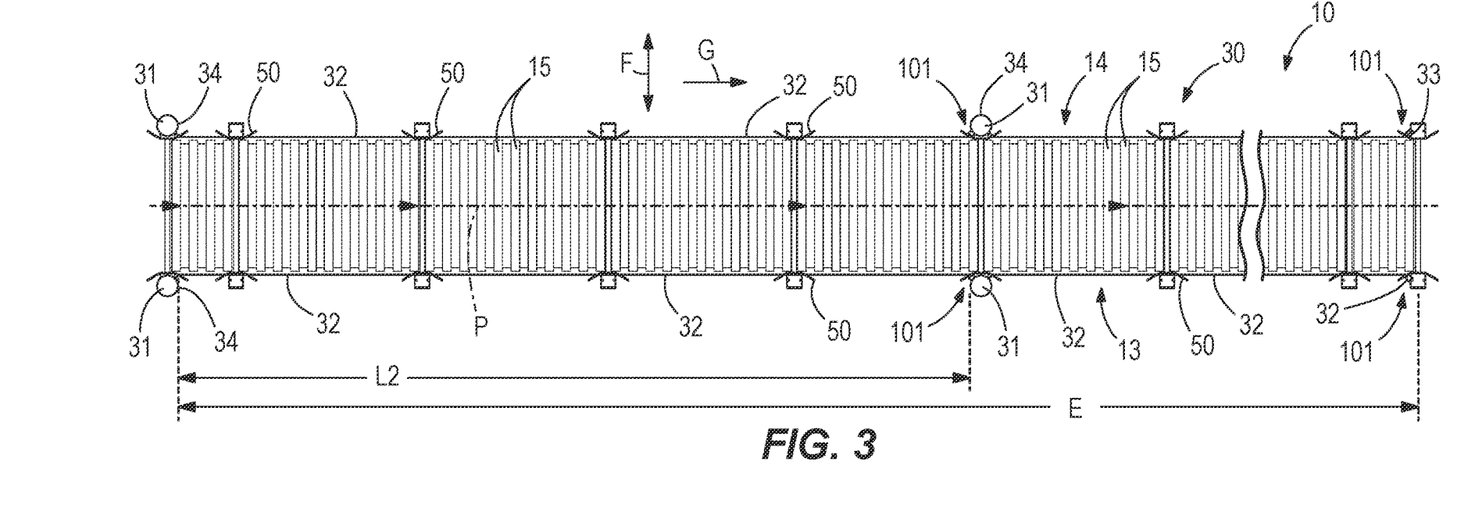
FIG. 3 is a top-down plan view of the conveyor of FIG. 1 in an extended position.
Figure 4:
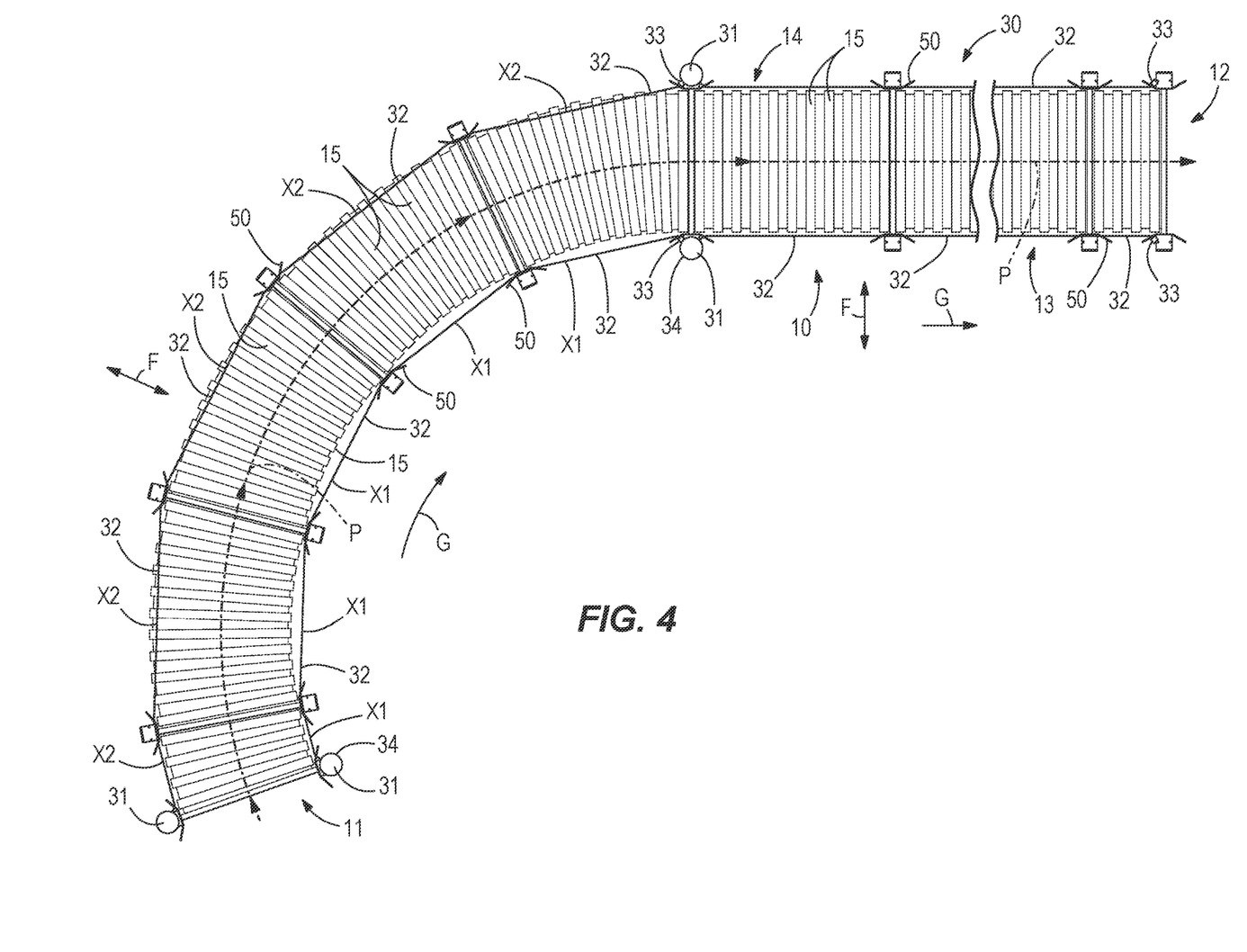
FIG. 4 is a top-down plan view of the conveyor of FIG. 1 in a curved position.

Each belt 32 is biased (e.g., spring biased) into the respective housing 34 and into a wound or retracted position with a biasing mechanism (not depicted) of the guide assembly 31. In one example, the biasing mechanism is a coil spring. A trailing end 35 (see FIG. 7 that depicts the trailing end 35 schematically as dash-dot box within the housing 34) of the belt 32 is in the housing 34. An opposite leading end 33 of each belt 32 extends from the housing 34 and is coupled to a bracket 50 (described hereinbelow) that is spaced apart from the housing 34. As such, a length of the belt 32 extends from the guide assembly 31A-D (e.g., a length of the belt 32 extending out of the housing 34) to the bracket 50. The length of belt 32 also extends along the side 13, 14 of the conveyor 10. In the example depicted in FIGS. 1-4, the belts 32 collectively extend along both sides 13, 14 of the conveyor 10 and thus prevent objects from falling in the cross-directions F over the sides 13, 14 of the conveyor 10 and out of the path P (FIG. 2-4). That is, as the objects are conveyed in the direction of conveyance G along the conveyor 10, the belts resist and/or prevent movement of the objects in the cross direction F over the sides 13,14 off the rollers 15 and out of the path P. The belts 32 thereby act as guides or barriers that prevent movement of the objects off the conveyor 10. That is, the belts 32 block movement of the objects over the sides 13, 14 of the conveyor 10 and thereby help to guide the objects downstream along the path P defined by the rollers 15 and the conveyor 10. In certain examples, the belts 32 may elastically move in response to an object contacting the belts 32. In this example, the belts 32 can cause the objects to move or "spring" back toward the centerline of the conveyor 10. Note that the system 30 can include any number of guide assemblies 31 and any number of brackets 50. For instance, the system 30 depicted in FIG. 1 includes four guide assemblies 31 and twenty-two brackets 50. Note that in certain examples, the bracket(s) 50 is fixed the conveyor 10 such that the bracket(s) 50 move with the conveyor 10. In certain examples, the trailing end 35 of the belt 32 is anchored in the housing 34 to a shaft (not depicted) that vertically extends (see axis V on FIG. 7) in the housing 34. In these examples, the trailing end 35 is fixed to the conveyor 10 when the housing 34 and the guide assembly 31 are fixed to conveyor 10 via the bracket 50. In certain examples, the length of the guide member 32 (e.g., belt 32) is be defined between the bracket 50 and a component of the guide assembly 31 such as the base 36, the housing 34, the shaft, or the axis V.

The length of the belts 32 extending out of the housings 34 can automatically change as the shape of the conveyor 10 and corresponding path P are changed. For example, as the conveyor 10 depicted in FIGS. 1-2 is moved into the extended position (FIG. 3) described above, the length/distance between the housing 34 and other brackets 50 coupled to the conveyor 10 changes. As noted above, the leading ends 33 of the belts 32 are each connected to a bracket 50 that is spaced apart from the housing 34 (see part numbers 101 on FIGS. 2-3 that denote the brackets 50 to which a leading ends 33 are held), and thus, an additional length of the belts 32 are automatically pulled out of the housings 34 as the conveyor 10 is moved into the different position. Therefore, the belts 32 continue to extend along the sides 13, 14 of the conveyor 10 even though the overall length of the conveyor 10 and path P has increased (see FIGS. 2-3). In a specific example, the length of a first belt 32 extending out of the housing 34 increases from a first length L1 (FIG. 2) to a second length L2 (FIG. 3).

In another example, as the conveyor 10 depicted in FIG. 3 is moved into the curved position depicted in FIG. 4, a portion of a first belt 32 is retracted into the housing 34 by the biasing mechanism and an additional length of a second belt 32 is pulled out of the other housing 34. Accordingly, the belts 32 automatically conform to the now curved sides 13, 14 of the conveyor 10. Again, the belts 32 continue to extend along the sides 13, 14 of the conveyor 10 even though the shape of the conveyor 10 has changed (see FIGS. 3-4). Note that in the example depicted in FIG. 4, the first belt 32 has five belt segments X1 that have a collective length that is shorter than the collective length of the five belt segments X2 of the second belt 32. Note that when the conveyor 10 is in the partially curved position (FIG. 4), one or more belt segments X2 of the belt 32 may lie vertically directly above the rollers 15.

Figure 5:
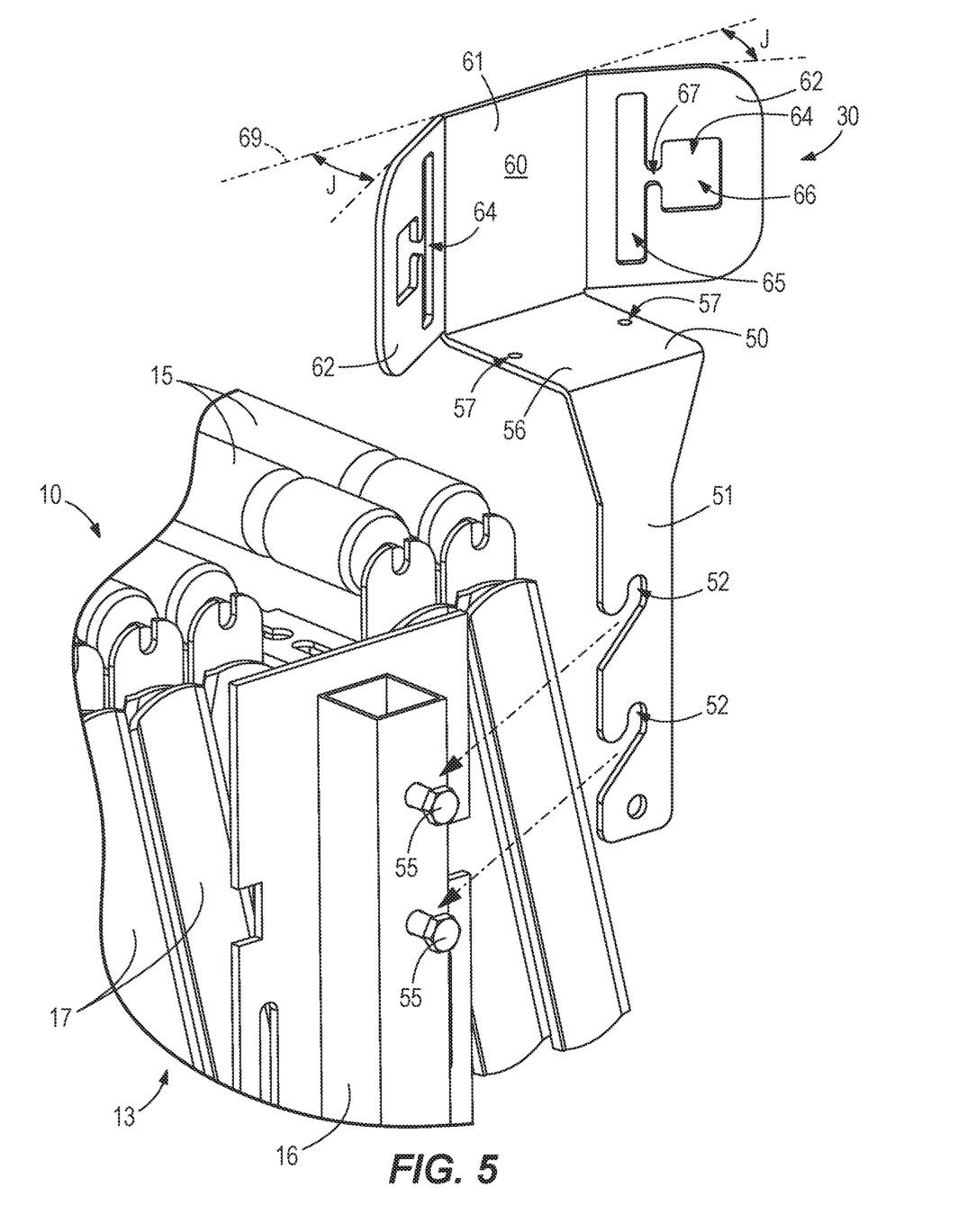
FIG. 5 is a perspective view of an example bracket of the present disclosure adjacent to a support post of an example conveyor.
Figure 6:
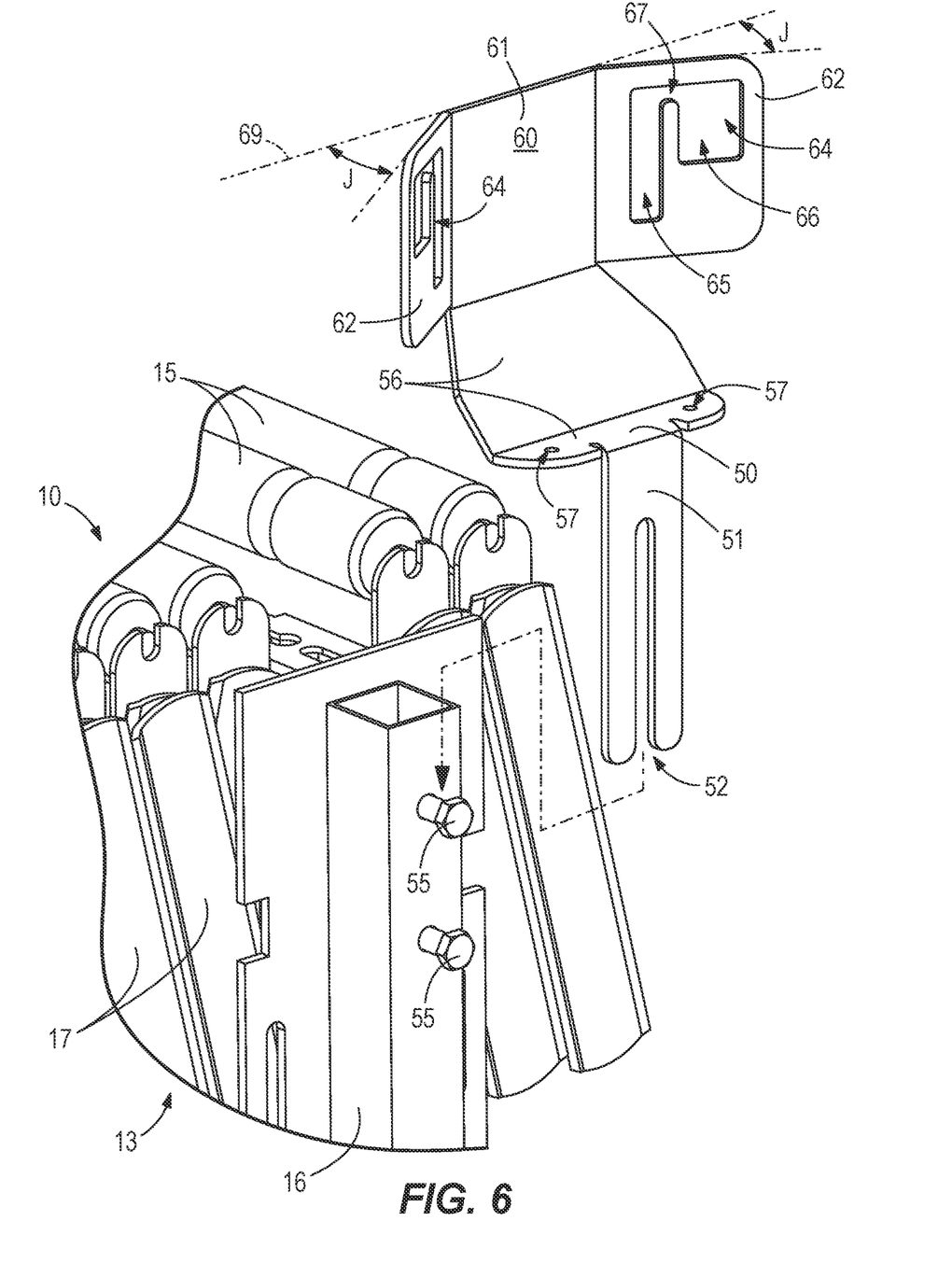
FIG. 6 is a perspective view of another example bracket of the present disclosure next to a support post of an example conveyor.

Referring now to FIG. 5, an example bracket 50 is depicted disconnected from a support post 16 of the conveyor 10. Generally, each bracket 50 includes a leg 51, a mounting plate 56 extending from the leg 51, and a guide plate 60 extending from the mounting plate 56. Note that the shape of the mounting plate 56 can vary based on the conveyor 10 and shape of the belt assembly 31. In the example depicted in FIG. 5, the mounting plate 56 is a planar plate that extends in one plane, e.g., the mounting plate 56 extends in a horizontal plane that is perpendicular to a body 61 of a guide plate 60 and the vertical plane 69 (described further herein). In the example depicted in FIG. 6, the mounting plate 56 is a bent angle plate that extends in two planes that extend transverse to each other. The leg 51 is for connecting the bracket 50 to the support post 16, and the leg 51 extends vertically along the support post 16. The leg 51 includes a pair of slots 52 that are each configured to receive shafts of bolts 55 that secure one or more links 17 to the support post 16. The bolts 55 are loosened by a technician such that the leg 51 is positionable and/or slidable between the head of the bolts 55 and the support post 16 and the shafts of the bolts 55 are at the closed ends of the slots 52. The technician then tightens the bolts 55 to secure the leg 51 to the support post 16. Note that the system 30 can include any number of brackets 50. FIG. 6 depicts another example bracket 50 is depicted disconnected from the support post 16 of the conveyor 10. In this example, the leg 51 includes one vertically extending slot 52 that is configured to receive one or more shafts of bolts 55.

Figure 7:
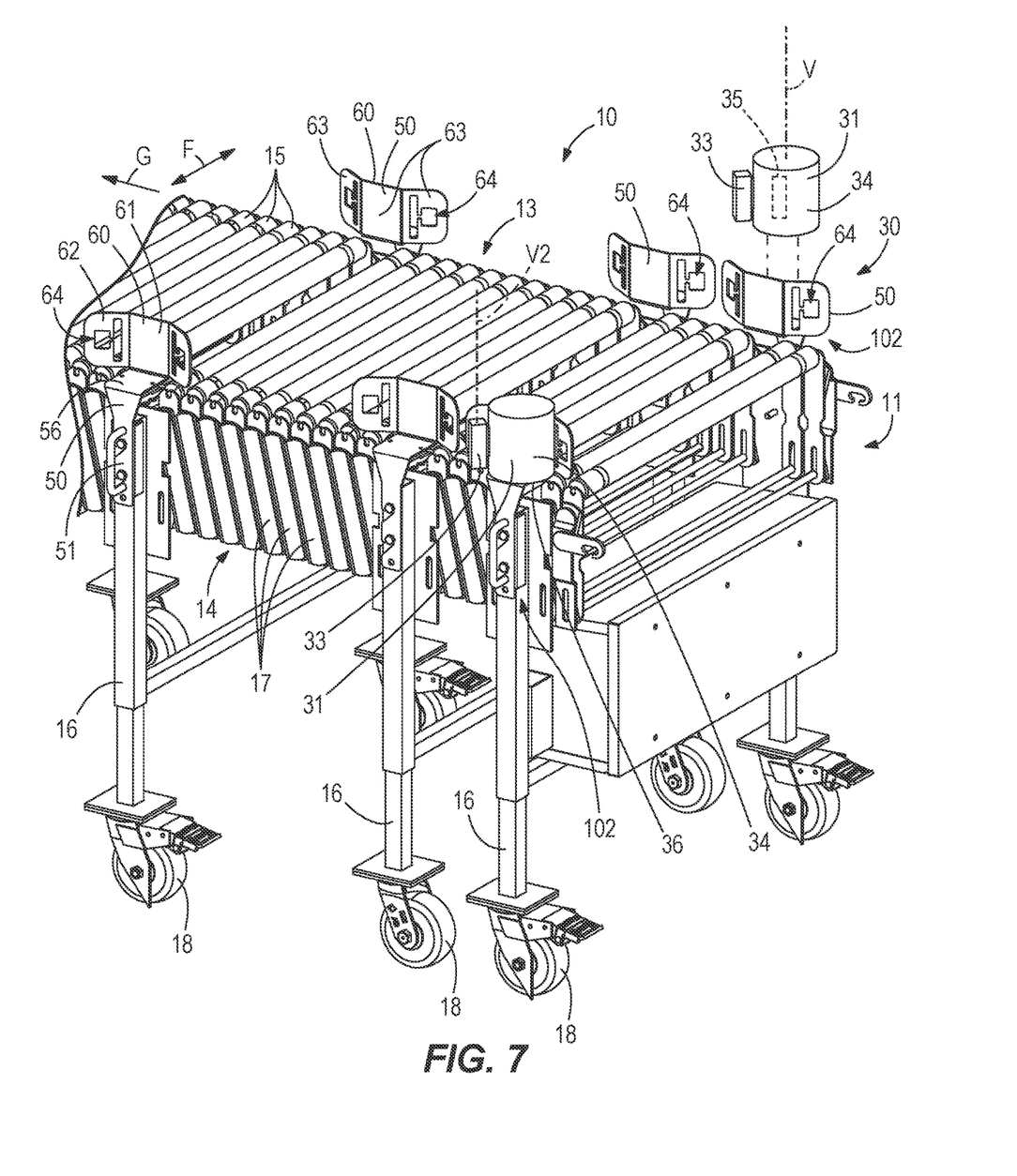
FIG. 7 is a perspective view of an example guide system of the present disclosure with belts of the guide system retracted into housings.

The guide plate 60 is coupled to the mounting plate 56 and vertically extends above the rollers 15 (see also FIG. 7). The guide plate 60 includes a body 61 and a pair of opposing arms 62. A contact surface 63 (see FIG. 6) extends across the body 61 and the arms 62 on the side of the guide plate 60 that faces toward the rollers 15. Objects on the conveyor 10 may contact the contact surface 63, and accordingly, like the belts 32, the contact surface 63 prevents the objects from moving over the side 13, 14 of the conveyor 10. Thus, the guide plate 60 and the belts 32 (FIG. 1) cooperate to prevent objects from falling off the conveyor 10. Note that the body 61 extends in a vertically extending plane (see dashed line 69 on FIG. 5 that schematically depicts the plane) that generally corresponds with the side 13, 14 of the conveyor 10. The arms 62 are angled or bent relative to the body 61, and thus, the arms 62 extend transverse to the body 61 and form an angle J (FIG. 5) relative to the body 61. The angle of the arms 62 relative to the body 61 reduces the likelihood that the objects will be blocked by the edge surface (e.g., thickness) of the guide plate and thereby reduces "catch points" that may snag or block conveyance of the objects on the conveyor 10. In certain examples, the arms 62 deflect the products in a direction away from the belt 32 and toward the centerline of the conveyor 10 and/or the center of path P. Furthermore, in certain examples, the arms 62 elastically deform or hinge relative to the body 61 as the object contacts the arms 62 such that the arm 62 pushes the object back toward the centerline of the conveyor 10.

Each arm 62 includes a slot 64 through which one of the belts 32 can be routed (described further herein). The slot 64 depicted in FIG. 5 is generally "T" shaped with a first section 65 and a second section 66 connected to the first section 65 via narrow transition section 67. The example slot 64 depicted in FIG. 6 is generally "P" or "L" shaped.

The brackets 50 coupled to the conveyor 10 can be utilized for one or more functions, and non-limiting exemplary functions of the brackets 50 are described hereinbelow.

The brackets 50 can facilitate coupling of the guide assembly 31 to the conveyor 10. That is, the housing 34 of the belt assembly 31 (FIG. 1) can be coupled to conveyor 10 via the mounting plate 56. Any suitable connector such as mechanical fasteners, adhesives, and adhesive tape. In the non-limiting example depicted in FIG. 5, the mounting plate 56 includes holes 57 for receiving mechanical fasteners (e.g., nuts and bolts) that secure the housing 34 to the bracket 50 (see part number 102 on FIG. 7 that denotes the brackets 50 to which the housing 34 of the guide assemblies 31 are coupled).

Figure 8:
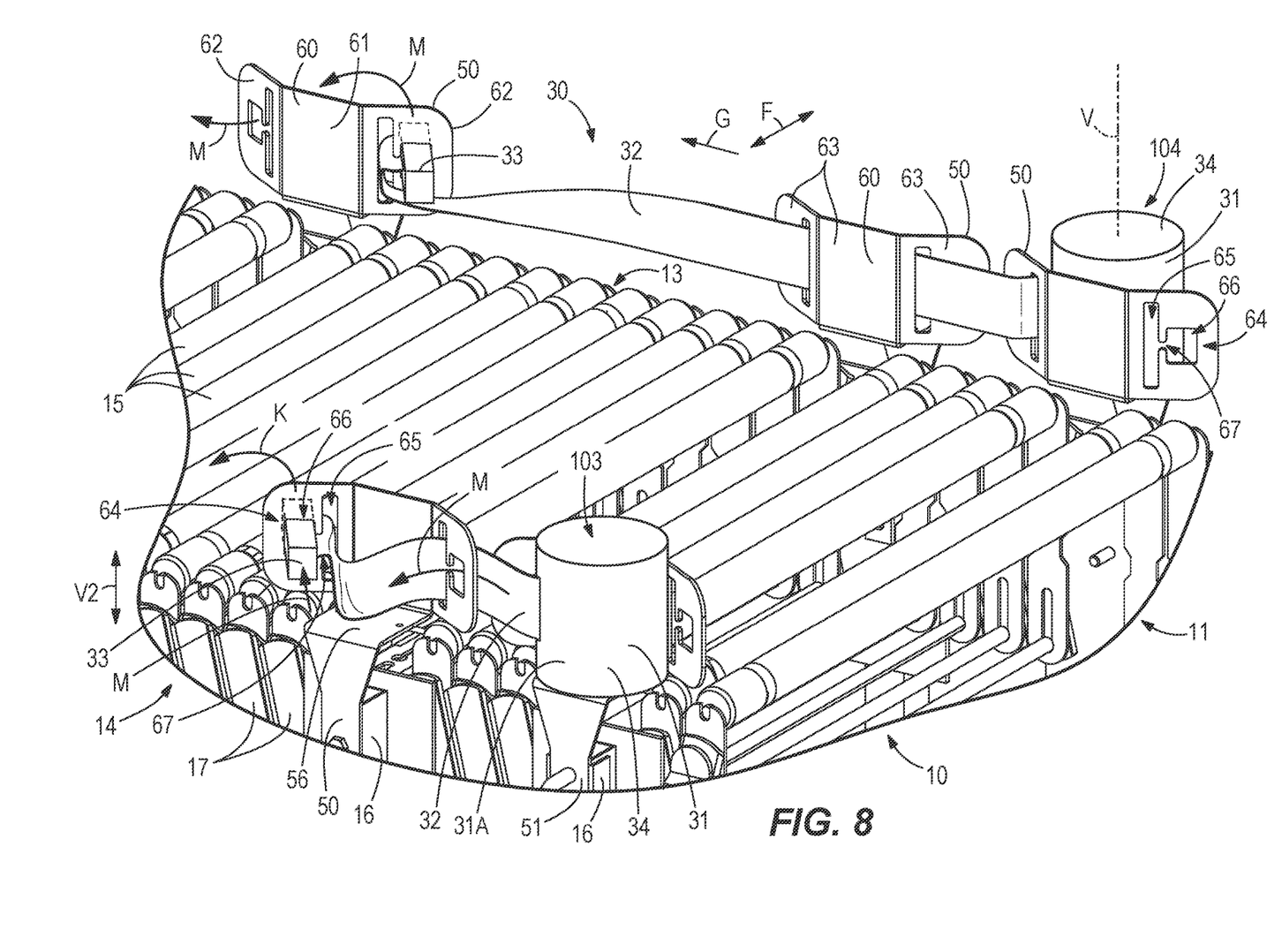
FIG. 8 is a perspective view of an example guide system coupled to an example conveyor.

Other brackets 50 facilitate coupling of the leading end 33 of the belts 32 to the conveyor 10 (see part numbers 101 on FIGS. 2-3 that denote the brackets 50 to which a leading ends 33 are coupled), and accordingly, the belts 32 extend along the sides 13, 14 of the conveyor 10 and correspond with the sides 13, 14 as the conveyor 10 is moved into different positions (as described above). Referring specifically to FIG. 8, an example movement sequence (see arrows M) to couple the leading end 33 to the bracket 50 is depicted. When regard to a first belt assembly 31 (see reference number 103 that denotes the first belt assembly 31 with corresponding belt 32 on FIG. 8), the leading end 33 is pulled away from the housing 34 such that a length of the belt 32 is pulled out of the housing 34. The leading end 33 is then pushed through the second section 66 of one of the arms 62 and the belt 32 is threaded or routed through the transition section 67 and the first section 65 (see movement arrows M on FIG. 8). Note that the cross-sectional shape of the leading end 33 corresponds to the shape of the second section 66, and accordingly, the leading end 33 is movable through the second section 66. The belt 32 and the leading end 33 are then routed through the slot 64 of the other arm 62. The technician can then pull the leading end 33 to other brackets 50 and similarly route the belt 32 through the corresponding slots 64.

Once the technician routes the belt 32 and the leading end 33 through a final or last bracket 50, the technician rotates the leading end 33 (see arrow K on FIG. 8) such that side surface of the leading end 33 contacts the contact surface 63 and does not pass back through the second section 66 as the biasing mechanism of the belt assembly 31 biases the belt 32 and the leading end 33 back into the housing 34. As such, the leading end 33 generally extends along the vertical axis (see arrow V3 on FIG. 8; see also FIG. 1 which depicts the leading end 33 vertically orientated) and is held or retained next to the contact surface 63 of the bracket 50. As the conveyor 10 is moved into a different position, the leading end 33 remains next to the contact surface 63 as the length of the belt 32 changes (e.g., as the belt 32 is automatically pulled out of the housings 34 or retracted into housing 34). Note that the technician can easily disconnect the belt 32 and the leading end 33 from the bracket(s) 50 by moving the belt 32 and the leading end 33 in the opposite direction through the slot 64.

Once the belts 32 are routed through the slots 64 as noted above, the first sections 65 of slots 64 permit the belts 32 to freely slide there through and therefore the guide plate 60 helps to maintain the belts 32 along the sides 13, 14 of the conveyor 10. As depicted in FIG. 8, the belt 32 is depicted routed through several slots 64 (see reference number 104 that denotes a second belt assembly 31 with corresponding belt 32 on FIG. 8) As the conveyor 10 is moved into different positions (see FIGS. 2-4), the guide plate 60 slides along the belt 32 and/or the belt 32 slides through the first sections 65 of the slot 64. Accordingly, the guide plates 60 remain coupled to the belt 32 and permit sliding of the belt 32 relative to the guide plate 60. Note that is certain examples, the brackets 50 and the belt 32 slide independently and relative to each other as the belt further extends out of or retracts into the housing 34, and thus, the brackets 50 through which the belt 32 extends does not impede free movement of the belt 32 there through and permits the belt 32 to freely extend or retract relative to the housing 34.

In certain examples, a guide system for an extendable conveyor that conveys a product includes a bracket configured to be coupled to the conveyor such that the bracket moves with the conveyor as the conveyor is moved into different positions. A guide member has a leading end coupled to the bracket and a trailing end configured to be coupled to the conveyor at a position spaced apart from the bracket. The guide member is configured to guide the product along the conveyor, and as the conveyor is moved, the guide member extends or retracts.

In certain examples, the guide member is a belt and the trailing end is positioned at an axis about which the belt is wound. As the bracket is moved with the conveyor away from the axis, a length of the belt between the axis and the bracket increases, and as the bracket is moved with the conveyor toward the axis, the length of the belt between the axis and the bracket decreases. In certain examples, the bracket is a first bracket and further comprising a second bracket configured to be coupled to the conveyor at a position between the trailing end of the belt and the first bracket. The second bracket is configured to hold the belt along the conveyor and wherein the belt slides through the second bracket as the conveyor is moved. In certain examples, bracket is a first bracket and further comprising a second bracket configured to be coupled to the conveyor at a position between the trailing end of the guide member and the first bracket. The second bracket is configured to hold the guide member along the conveyor as the conveyor is moved.

In certain examples, the guide member slides through the second bracket as the guide member extends or retracts. In certain examples, the second bracket has a body and opposing arms. A first slot is defined in one of the opposing arms and a second slot is defined in the other of the opposing arms such that the guide member slides through the first slot and the second slot and along the body. In certain examples, the opposing arms are each angled relative to the body and configured to deflect the product away from the belt.

In certain examples, a system for conveying a product includes a conveyor configured to convey the product and the conveyor is movable into different positions. A bracket is coupled to the conveyor such that the bracket moves with the conveyor. A guide member has a leading end coupled to the bracket and a trailing end coupled to the conveyor at a position spaced apart from the bracket. The guide member is configured to guide the product along the conveyor, and as the conveyor is moved, the guide member extends or retracts.

In certain examples, the guide member is a belt and the trailing end is positioned at an axis about which the belt is wound such that as the bracket is moved with the conveyor away from the axis, the belt unwinds and a length of the belt between the axis and the bracket increases and as the bracket is moved with the conveyor toward the axis, the belt winds about the axis and the length of the belt between the axis and the bracket decreases.

In certain examples, the bracket is a first bracket and further comprising a second bracket coupled to the conveyor at a position between the trailing end and the first bracket, and the second bracket holds the belt along the conveyor and the belt slides through the second bracket as the conveyor is moved.

In certain examples, the bracket is a first bracket and further comprising a second bracket coupled to the conveyor at a position between the trailing end and the first bracket. The second bracket is configured to hold the guide member along the conveyor as the conveyor is moved. In certain examples, the guide member slides through the second bracket as the guide member extends or retracts. In certain examples, the second bracket defines a slot through which the guide member slides. In certain examples, the second bracket has a body and opposing arms. A slot is a first slot defined in one of the opposing arms and a second slot is defined in the other of the opposing arms such that the guide member slides through the first slot and the second slot and along the body. In certain examples, the opposing arms are each angled relative to the body and thereby configured to deflect the product away from the belt.

In certain examples, a guide system for an extendable conveyor that conveys a product includes a bracket configured to be coupled to the conveyor such that the bracket moves with the conveyor as the conveyor is moved into different positions. A guide assembly has a base configured to be coupled to the conveyor and a guide member configured to guide the product along the conveyor. The guide assembly is spaced apart from the bracket and the guide member has a trailing end and an opposite leading end. The leading end is coupled to the bracket such that a length of the guide member extends between the base and the bracket and along the conveyor, and the leading end is configured to move with the bracket as the conveyor is moved into different positions such that the length of the guide member increases or decreases.

In certain examples, the guide member is a belt. In certain examples, as the bracket is moved with the conveyor away from the guide assembly, a length of the belt between the guide assembly and the bracket increases and as the bracket is moved with the conveyor toward the guide assembly, the length of the belt between the guide assembly and the bracket decreases. In certain examples, the bracket is a first bracket and further comprising a second bracket is configured to be coupled to the conveyor at a position between the guide assembly and the first bracket. The second bracket holds the belt along the conveyor and the belt slides through the second bracket as the conveyor is moved.

In certain examples, the second bracket has a body and opposing arms, a first slot is defined in one of the opposing arms and a second slot is defined in the other of the opposing arms, and the guide member slides through the first slot and the second slot and along the body.

In the present description, certain terms have been used for brevity, clarity, and understanding. No unnecessary limitations are to be inferred therefrom beyond the requirement of the prior art because such terms are used for descriptive purposes and are intended to be broadly construed. The different apparatuses, systems, and method steps described herein may be used alone or in combination with other apparatuses, systems, and methods. It is to be expected that various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A guide system for an extendable conveyor that conveys a product, the guide system comprising:
    a first bracket configured to be coupled to the conveyor such that the first bracket moves with the conveyor as the conveyor is moved into different positions;
    a guide member having a leading end coupled to the first bracket and a trailing end configured to be coupled to the conveyor at a position spaced apart from the first bracket;
    wherein the guide member is configured to guide the product along the conveyor;
    wherein as the conveyor is moved, the guide member extends or retracts; and
    a second bracket configured to be coupled to the conveyor at a position between the trailing end of the guide member and the first bracket;
    wherein the second bracket is configured to hold the guide member along the conveyor as the conveyor is moved;
    wherein the guide member slides through the second bracket as the guide member extends or retracts; and
    wherein the second bracket has a body and opposing arms, wherein a first slot is defined in one of the opposing arms and a second slot is defined in the other of the opposing arms; and
    wherein the guide member slides through the first slot and the second slot and along the body.

2. The guide system according to claim 1, wherein the guide member is a belt and the trailing end is positioned at an axis about which the belt is wound;
    wherein as the first bracket is moved with the conveyor away from the axis, a length of the belt between the axis and the first bracket increases; and
    wherein as the first bracket is moved with the conveyor toward the axis, the length of the belt between the axis and the first bracket decreases.

3. The guide system according to claim 2,
    wherein the second bracket is configured to be coupled to the conveyor at a position between the trailing end of the belt and the first bracket, and wherein the second bracket is configured to hold the belt along the conveyor and wherein the belt slides through the second bracket as the conveyor is moved.

4. The guide system according to claim 1, wherein the opposing arms are each angled relative to the body and configured to deflect the product away from the guide member.

5. A guide system for conveying a product, the guide system comprising:
    a conveyor configured to convey the product, wherein the conveyor is movable into different positions;
    a first bracket coupled to the conveyor such that the first bracket moves with the conveyor; and
    a guide member has a leading end coupled to the first bracket and a trailing end coupled to the conveyor at a position spaced apart from the first bracket;
    wherein the guide member is configured to guide the product along the conveyor;
    wherein as the conveyor is moved, the guide member extends or retracts; and
    a second bracket coupled to the conveyor at a position between the trailing end and the first bracket;
    wherein the second bracket is configured to hold the guide member along the conveyor as the conveyor is moved;
    wherein the second bracket defines a slot through which the guide member slides;
    wherein the second bracket has a body and opposing arms;
    wherein the slot is a first slot defined in one of the opposing arms and a second slot is defined in the other of the opposing arms; and
    wherein the guide member slides through the first slot and the second slot and along the body.

6. The guide system according to claim 5, wherein the guide member is a belt and the trailing end is positioned at an axis about which the belt is wound;
    wherein as the first bracket is moved with the conveyor away from the axis, the belt unwinds and a length of the belt between the axis and the first bracket increases; and
    wherein as the first bracket is moved with the conveyor toward the axis, the belt winds about the axis and the length of the belt between the axis and the first bracket decreases.

7. The guide system according to claim 6,
    wherein the second bracket is coupled to the conveyor at a position between the trailing end and the first bracket, and wherein the second bracket holds the belt along the conveyor and the belt slides through the second bracket as the conveyor is moved.

8. The guide system according to claim 5, wherein the guide member slides through the second bracket as the guide member extends or retracts.

9. The guide system according to claim 5, wherein the opposing arms are each angled relative to the body and thereby configured to deflect the product away from the guide member.

10. A guide system for an extendable conveyor that conveys a product, the guide system comprising:

a first bracket configured to be coupled to the conveyor such that the first bracket moves with the conveyor as the conveyor is moved into different positions;

a guide assembly having a base configured to be coupled to the conveyor and a belt configured to guide the product along the conveyor, the base is spaced apart from the first bracket and the belt has a trailing end and an opposite leading end;

wherein the leading end is coupled to the first bracket such that a length of the belt extends between the base and the first bracket and along the conveyor;

wherein the leading end is configured to move with the first bracket as the conveyor is moved into different positions such that the length of the belt increases or decreases;

wherein as the first bracket is moved with the conveyor away from the base, a length of the belt between the base and the first bracket increases;

wherein as the first bracket is moved with the conveyor toward the base, the length of the belt between the base and the first bracket decreases; and a second bracket configured to be coupled to the conveyor at a position between the base and the first bracket, and wherein the second bracket holds the belt along the conveyor and the belt slides through the second bracket as the conveyor is moved; and wherein the second bracket has a body and opposing arms, a first slot is defined in one of the opposing arms and a second slot is defined in the other of the opposing arms; and wherein the belt slides through the first slot and the second slot and along the body.

11. A guide system for a conveyor that conveys a product, the guide system comprising:

a first bracket configured to be coupled to the conveyor;

a guide assembly having a base configured to be coupled to the conveyor and a guide member configured to guide the product along the conveyor, the base is spaced apart from the first bracket and the guide member has a leading end that is coupled to the first bracket; and a second bracket configured to be coupled to the conveyor at a position between the base and the first bracket, the second bracket has a body, opposing arms, a first slot is defined in one of the opposing arms, and a second slot is defined in the other of the opposing arms;

wherein the guide member extends through the first slot and the second slot; and wherein the leading end is configured to move with the first bracket and the guide member slides through the first slot and the second slot and along the body as the conveyor is moved into different positions.

* * * * *